US012510594B2

(12) United States Patent
Kim et al.

(10) Patent No.: US 12,510,594 B2
(45) Date of Patent: Dec. 30, 2025

(54) SYSTEM AND METHOD OF MONITORING PERFORMANCE OF AN ELECTRONIC DEVICE

(71) Applicant: SAMSUNG ELECTRONICS CO., LTD., Suwon-si (KR)

(72) Inventors: Sunwook Kim, Seoul (KR); Heeseong Lee, Siheung-si (KR); Myonghoon Yang, Suwon-si (KR); Manhwee Jo, Seoul (KR); Wooil Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 496 days.

(21) Appl. No.: 17/988,989

(22) Filed: Nov. 17, 2022

(65) Prior Publication Data

US 2023/0184830 A1    Jun. 15, 2023

(30) Foreign Application Priority Data

Dec. 10, 2021 (KR) .................. 10-2021-0176820
Mar. 10, 2022 (KR) .................. 10-2022-0030048

(51) Int. Cl.
*G01R 31/317* (2006.01)

(52) U.S. Cl.
CPC . *G01R 31/31718* (2013.01); *G01R 31/31712* (2013.01); *G01R 31/31723* (2013.01)

(58) Field of Classification Search
CPC ........ G01R 31/31718; G01R 31/31712; G01R 31/00; G01R 31/2601; G06F 11/30; G06F 11/3409; G06F 11/3466; G06F 11/3476; G06F 11/348; G06F 2201/86; G06F 2201/88
See application file for complete search history.

(56) References Cited

U.S. PATENT DOCUMENTS 6,021,457 A    2/2000  Archer et al.
6,629,170 B1   9/2003  Davidson et al.
(Continued)

FOREIGN PATENT DOCUMENTS

CN    105589821 A  *  5/2016  ............. G06F 13/36
CN    109217983 A  *  1/2019  ........... H04L 1/0006
(Continued)

OTHER PUBLICATIONS

CN 105589821 translation (Year: 2014).*
CN 109217983 translation (Year: 2019).*

*Primary Examiner* — Manuel L Barbee
(74) *Attorney, Agent, or Firm* — MORGAN, LEWIS & BOCKIUS LLP

(57) ABSTRACT

A system of monitoring performance of an electronic device including: a plurality of performance monitoring circuits included in an electronic device, wherein the plurality of performance monitoring circuits are configured to generate a plurality of monitor output signals including performance data of the electronic device; a monitoring bus configured to receive the plurality of monitor output signals and generate a bus output signal by interleaving the performance data included in the plurality of monitor output signals; and an embedded trace router configured to receive the bus output signal and store, in a memory device included in the electronic device, the performance data included in the bus output signal.

19 Claims, 16 Drawing Sheets

(56) References Cited

U.S. PATENT DOCUMENTS

| | | | |
|---|---|---|---|
| 7,490,117 B2 | 2/2009 | Subramoney et al. | |
| 7,548,832 B2 | 6/2009 | Mericas | |
| 9,766,997 B2 | 9/2017 | Brandt | |
| 2013/0042155 A1* | 2/2013 | Millet | G06F 11/3648 714/45 |
| 2015/0372845 A1* | 12/2015 | Yoshimochi | H04L 5/0091 370/542 |
| 2019/0310308 A1* | 10/2019 | Hess | G05B 23/0283 |

FOREIGN PATENT DOCUMENTS

| | | |
|---|---|---|
| JP | 4504737 | 7/2010 |
| JP | 6064756 | 1/2017 |

* cited by examiner

FIG. 8B

| PORT | BIT SIZE | I/O | DESCRIPTION |
|---|---|---|---|
| RDY | 1 | INPUT | RDY is activated whenever SL is ready to receive DT |
| VLD | 1 | OUTPUT | VLD is activated when MS is ready to send PKT |
| DT | 64 | OUTPUT | PKT is divided into 64b-bit slices and each slice is sent via interface |
| LST | 1 | OUTPUT | LST is activated with VLD when last slice is to be sent |

SYSTEM AND METHOD OF MONITORING PERFORMANCE OF AN ELECTRONIC DEVICE

CROSS-REFERENCE TO RELATED APPLICATIONS

This U.S. non-provisional application claims priority under 35 U.S.C. § 119 to Korean Patent Application No. 10-2021-0176820, filed on Dec. 10, 2021 and Korean Patent Application No. 10-2022-0030048, filed on Mar. 10, 2022, in the Korean Intellectual Property Office (KIPO), the disclosures of which are incorporated by reference herein in their entireties.

1. Technical Field

Example embodiments of the present disclosure relate generally to semiconductor integrated circuits, and more particularly to a system and a method of monitoring performance of an electronic device.

2. Discussion of the Related Art

Processing circuitry such as a system on chip (SOC) or an application processor (AP) included in various electronic devices continue to increase in complexity. A clock frequency of the processing circuitry may be increased to increase performance of the electronic device including the processing circuitry. Analysis of performance of the electronic device at an increased clock frequency is an important factor in designing its processing circuitry.

SUMMARY

Some example embodiments of the present disclosure may provide a system and a method of monitoring performance of an electronic device, by efficiently collecting performance data of the electronic device.

According to example embodiments of the present disclosure, a system of monitoring performance of an electronic device includes: a plurality of performance monitoring circuits included in an electronic device, wherein the plurality of performance monitoring circuits are configured to generate a plurality of monitor output signals including performance data of the electronic device; a monitoring bus configured to receive the plurality of monitor output signals and generate a bus output signal by interleaving the performance data included in the plurality of monitor output signals; and an embedded trace router configured to receive the bus output signal and store, in a memory device included in the electronic device, the performance data included in the bus output signal.

According to example embodiments of the present disclosure, a performance monitoring system integrated in a system on chip (SOC) to monitor performance of the SOC, the SOC including a system interconnector and a plurality of function blocks connected to the system interconnector includes: a plurality of performance monitoring circuits included in an SOC, wherein the plurality of performance monitoring circuit are configured to generate a plurality of monitor output signals including performance data of the SOC; a monitoring bus configured to receive the plurality of monitor output signals and generate a bus output signal by interleaving the performance data included in the plurality of monitor output signals; and an embedded trace router configured to receive the bus output signal and store, in a memory device included in the SOC, the performance data included in the bus output signal, wherein each performance monitoring circuit of the plurality of performance monitoring circuits is configured to packetize the performance data collected thereby during a unit time to output a plurality of packets corresponding to a plurality of unit times one by one, and configured to divide each packet into a plurality of slices to sequentially transfer the plurality of slices to the monitoring bus, and wherein the monitoring bus is configured to generate the bus output signal by interleaving, slice by slice, the packets respectively output from the plurality of performance monitoring circuits.

According to example embodiments of the present disclosure, a method of monitoring performance of an electronic device includes: generating, using a plurality of performance monitoring circuits distributed in an electronic device, a plurality of monitor output signals including performance data of the electronic device; generating, using a monitoring bus configured to receive the plurality of monitor output signals, a bus output signal by interleaving the performance data included in the plurality of monitor output signals; and storing, using an embedded trace router configured to receive the bus output signal, in a memory device included in the electronic device, the performance data included in the bus output signal.

BRIEF DESCRIPTION OF THE DRAWINGS

Example embodiments of the present disclosure will be more clearly understood from the following detailed description taken in conjunction with the accompanying drawings.

FIGS. 8A, 8B and 8C are diagrams illustrating a transaction performed by a performance monitoring system according to example embodiments of the present disclosure.

DETAILED DESCRIPTION OF THE EMBODIMENTS

Figure 1:
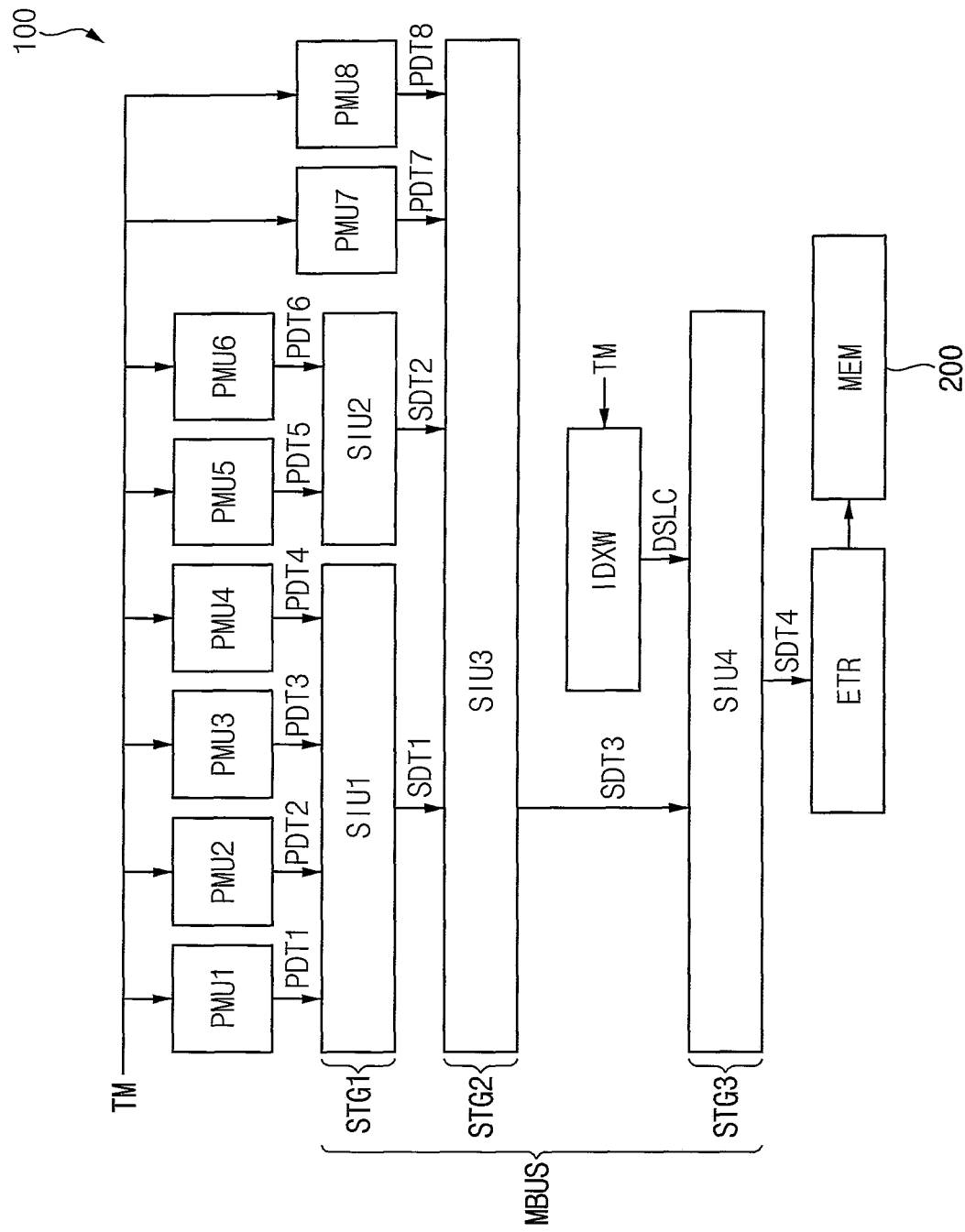
FIG. 1 is a block diagram illustrating a performance monitoring system according to example embodiments of the present disclosure.

Various example embodiments of the present disclosure will be described more fully hereinafter with reference to the accompanying drawings. In the drawings, like numerals may refer to like elements throughout. The repeated descriptions may be omitted.

Figure 2:
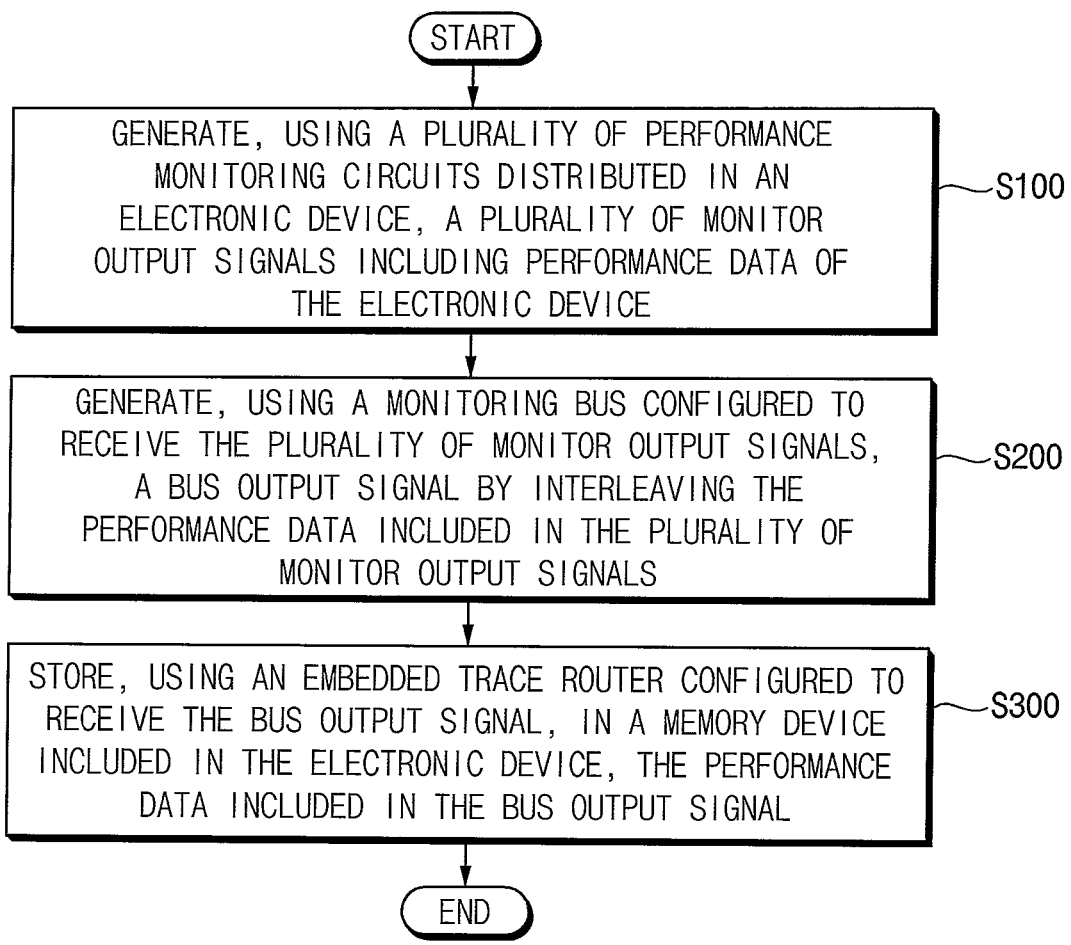
FIG. 2 is a flowchart illustrating a performance monitoring method according to example embodiments of the present disclosure.

FIG. 1 is a block diagram illustrating a performance monitoring system according to example embodiments of the present disclosure, and. FIG. 2 is a flowchart illustrating a performance monitoring method according to example embodiments of the present disclosure.

Referring to FIG. 1, a performance monitoring system 100 may include a plurality of performance monitoring circuits PMU1, PMU2, PMU3, PMU6, PMU7 and PMU8 (hereinafter referred to as PMU1~PMU8), a monitoring bus MBUS and an embedded trace router ETR. According to example embodiments of the present disclosure, the performance monitoring system 100 may further include an index writer IDXW and/or a memory device MEM 200. The memory device 200 may be included in and dedicated to the performance monitoring system 100 or may be disposed out of the performance monitoring system 100 to be shared in other components in an electronic device in which the performance monitoring system 100 is integrated.

As will be described below with reference to FIG. 3, the performance monitoring system 100 may be integrated in the electronic device to monitor performance of the electronic device. The plurality of performance monitoring circuits PMU1~PMU8 may be distributed in the electronic device. FIG. 1 illustrates the eight performance monitoring circuits PMU1~PMU8 for convenience of illustration, and the number of the performance monitoring circuits may be determined variously. In other words, more than eight or fewer than eight performance monitoring circuits may be distributed throughout the electronic device.

Referring to FIGS. 1 and 2, using the plurality of performance monitoring circuits PMU1~PMU8 distributed in an electronic device, a plurality of monitor output signals PDT1, PDT2, PDT3, PDT4, PDT5, PDT6, PDT7 and PDT8 (hereinafter referred to as PDT1~PDT8) including performance data of the electronic device may be generated (S100).

Using the monitoring bus MBUS configured to receive the plurality of monitor output signals PDT1~PDT8, a bus output signal SDT4 may be generated by interleaving the performance data included in the plurality of monitor output signals PDT1~PDT8 (S200).

Using the embedded trace router ETR configured to receive the bus output signal SDT4, the performance data included in the bus output signal SDT4 may be stored in the memory device 200 included in the electronic device (S300).

In some example embodiments of the present disclosure, as will be described below with reference to FIGS. 4 through 6B, each performance monitoring circuit of the plurality of performance monitoring circuits PMU1~PMU8 may packetize the performance data collected during a unit time to output a plurality of packets corresponding to a plurality of unit times one by one per unit time.

In addition, each performance monitoring circuit of the plurality of performance monitoring circuits PMU1~PMU8 may divide each packet into a plurality of slices to sequentially transfer the plurality of slices to the monitoring bus MBUS. In other words, each monitor output signal of the plurality of monitor output signals PDT1~PDT4 may include slices that are generated and output sequentially. In this case, the monitoring bus MBUS may generate the bus output signal SDT4 by interleaving, slice by slice, the packets respectively output from the plurality of performance monitoring circuits PMU1~PMU8. The embedded trace router ETR may sequentially receive slices through the bus output signal SDT4 and store the slices in the memory device 200 according to an order in which it receives the slices.

In some example embodiments of the present disclosure, the performance monitoring system 100 may adopt a handshake scheme to transfer the performance data from the plurality of performance monitoring circuits PMU1~PMU8 to the embedded trace router ETR through the monitoring bus MBUS. The plurality of performance monitoring circuits PMU1~PMU8 may transfer the performance data included in the plurality of monitor output signals PDT1~PDT8 to the monitoring bus MBUS according to the handshake scheme using a valid signal and a ready signal, and the monitoring bus MBUS may transfer the performance data included in the bus output signal SDT4 to the embedded trace router ETR according to the handshake scheme. The transfer according to the handshake scheme will be further described with reference to FIGS. 7A through 8C.

In some example embodiments of the present disclosure, as illustrated in FIG. 1, the monitoring bus MBUS may include a plurality of stages STG1, STG2 and STG3 configured to sequentially interleave and transfer the performance data to the embedded trace router ETR. FIG. 1 illustrates the three stages STG1, STG2 and STG3 for convenience of illustration, and the number of the stages may be determined variously. In other words, more than three or fewer than three stages may be included in the monitoring bus MBUS.

Each stage of the plurality of stages STG1, STG2 and STG3 may include one or more serial interconnect circuits. For example, the first stage STG1 may include a first serial interconnect circuit SIU1 and a second serial interconnect circuit SIU2, the second stage STG2 may include a third serial interconnect circuit SIU3, and the third stage STG3 may include a fourth serial interconnect circuit SIU4. The number of the serial interconnect circuits included in each stage may be determined variously. For example, each stage may include at least one serial interconnect circuit.

Each serial interconnect circuit of the serial interconnect circuits SIU1~SIU4 may receive two or more input signals and generate one output signal. For example, the first serial interconnect circuit SIU1 may receive first, second, third and fourth monitor output signals PDT1~PDT4 and output a first interconnect signal SDT1. The second serial interconnect circuit SIU2 may receive fifth and sixth monitor output signals PDT5 and PDT6 and output a second interconnect signal SDT2. The third serial interconnect circuit SIU3 may receive the first and second interconnect signals SDT1 and SDT2 and seventh and eighth monitor output signals PDT7~PDT8 and output a third interconnect signal SDT3. The fourth serial interconnect circuit SIU4 may receive the third interconnect signal SDT3 and an output signal DSLC from the index writer IDXW and output a fourth interconnect signal SDT4.

The fourth interconnect signal SDT4 output from the fourth serial interconnect circuit SIU4 of the last stage, i.e., the third stage STG3, may be provided to the embedded trace router ETR as the above-mentioned bus output signal.

The index writer IDVXW may generate a plurality of index slices DSLC including a packet identification number that sequentially increases per unit time and transfer the plurality of index slices DSLC to the embedded trace router ETR one by one per unit time. The plurality of index slices DSLC are provided to the fourth serial interconnect circuit SIU4 as the above-mentioned output signal of the index writer IDXW. In this case, the monitoring bus MBUS may generate the bus output signal SDT4 by interleaving the slices generated by the plurality of performance monitoring circuits PMU1~PMU8 and the plurality of index slices DSLC generated by the index writer IDXW. The plurality of index slices will be further described with reference to FIG. 9C.

As such, performance of an electronic device may be monitored using the plurality of performance monitoring circuits PMU1~PMU8 which are distributed in the electronic device. Each performance monitoring circuit of the plurality of performance monitoring circuits PMU1~PMU8 may measure performance of each component of the electronic device or each location of the electronic device to provide the performance data. The performance data generated by plurality of performance monitoring circuits PMU1~PMU8 may be transferred to the embedded trace router ETR through the monitoring bus MBUS, and the embedded trace router ETR may store the collected performance data in the memory device 200. After the measured performance data are stored in the memory device 200, a user may access the stored performance data and analyze the performance of the electronic device.

It is generally required to periodically measure and collect the performance data to detect changes in performance over time. As the performance data is measured more frequently, the performance data has to be repeatedly transferred from the plurality of performance monitoring circuits PMU1~PMU8 to the embedded trace router ETR. In general, an internal processor such as a central processing unit (CPU) may take charge of collecting the performance data by reading the performance data from the plurality of performance monitoring circuits PMU1~PMU8 and writing the performance data in a memory device. As the number of the performance monitoring circuits included in the electronic device is increased, the processing speed is limited because the collection of the performance data has to be completed within limited bandwidth. As a consequence, sufficient fine-grained performance data may not be collected with the shorter period due to such limited processing speed of the processor.

In contrast, the system 100 and the method of monitoring performance of an electronic device according to example embodiments of the present disclosure may increase the amount of the collected performance data by collecting the performance data in the single embedded trace router ETR through the independent generation of the performance data by the plurality of performance monitoring circuits PMU1~PMU8 and the sequential interleaving of the performance data by the monitoring bus MBUS. The fine-grained performance analysis may be implemented based on the increased amount of the performance data.

In addition, the system 100 and the method of monitoring performance of an electronic device may increase the transfer speed of the performance data and further increase the amount of the collected performance data by packetizing the performance data and dividing each packet into the plurality of slices to perform interleaving by units of slices.

Figure 3:
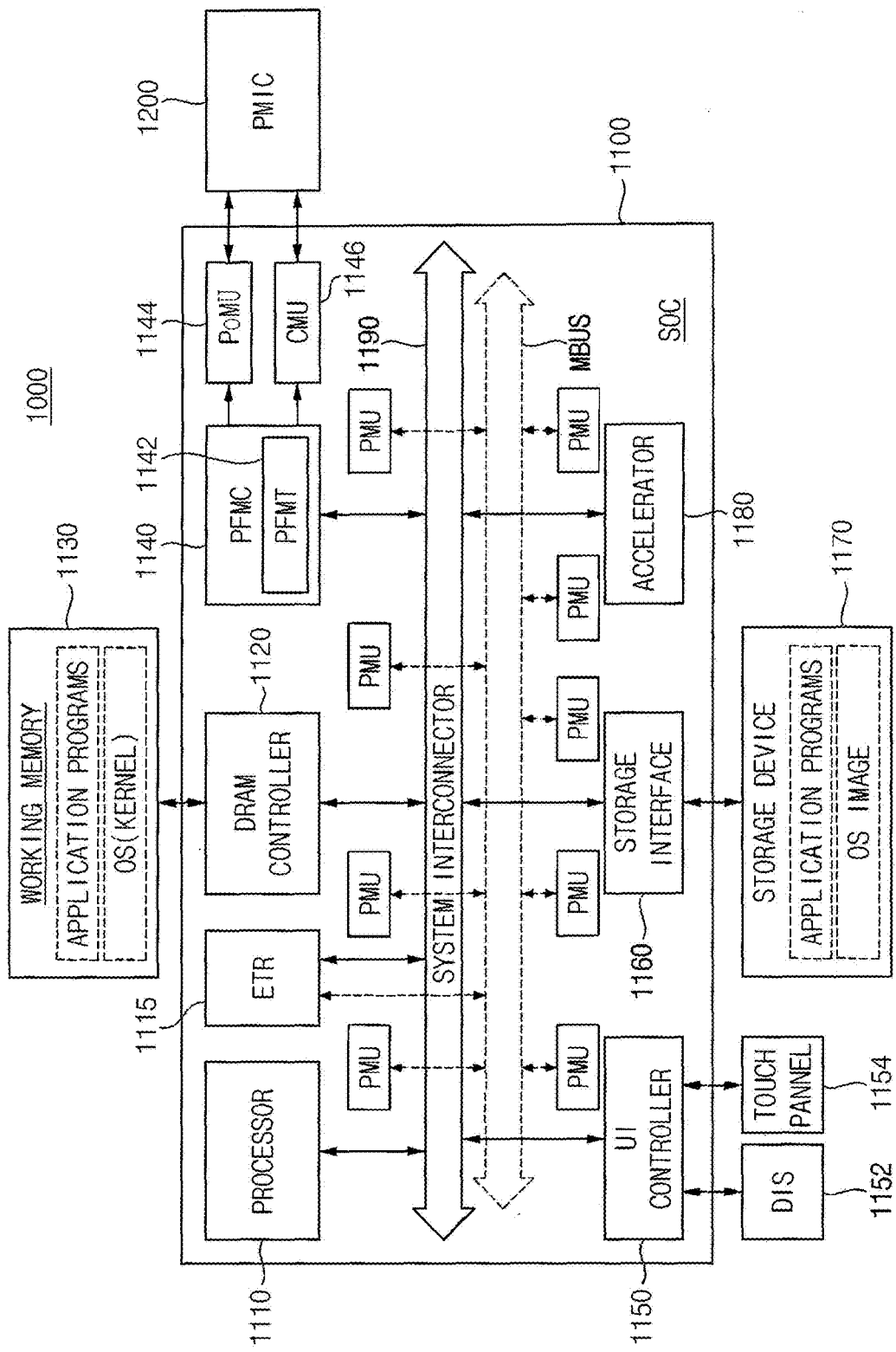
FIG. 3 is a block diagram illustrating an electronic device including a performance monitoring system according to example embodiments of the present disclosure.

FIG. 3 is a block diagram illustrating an electronic device including a performance monitoring system according to example embodiments of the present disclosure.

Referring to FIG. 3, an electronic device 1000 may include a system on chip (SOC) 1100, a working memory 1130, a display device (DIS) 1152, a touch panel 1154, a storage device 1170, a power management integrated circuit (PMIC) 1200, etc.

The SOC 1100 may include a processor 1110, a dynamic random access memory (DRAM) controller 1120, a performance controller 1140, a user interface controller (UI controller) 1150, a storage interface 1160, an accelerator 1180, a power management unit (PoMU) 1144, a clock management unit (CMU) 1146, a system interconnector 1190, a plurality of performance monitoring circuits PMU, a monitoring bus MBUS, an embedded trace router ETR 1115, etc. The plurality of performance monitoring circuits PMU, the monitoring bus MBUS and the embedded trace router 1115 correspond to the performance monitoring system 100 as described with reference to FIG. 1. It will be understood that components of the electronic device 1000 are not limited to the components shown in FIG. 3. For example, the electronic device 1000 may further include a hardware codec, a security block, a neural processing unit, etc.

The processor 1110 executes software (for example, an application program, an operating system (OS), and device drivers) for the electronic device 1000. The processor 1110 may execute the operating system (OS) which may be loaded into the working memory 1130. The processor 1110 may execute various application programs to be driven on the operating system (OS). The processor 1110 may be provided as a homogeneous multi-core processor or a heterogeneous multi-core processor. A multi-core processor is a computing component including at least two independently drivable processors (hereinafter referred to as "cores" or "processor cores"). Each of the cores may independently read and execute program instructions.

The processor cores of the processor 1100 may be grouped into a plurality of clusters that operate with an independent driving clock and an independent driving voltage. The processor cores in the same cluster may be included in a clock domain operating based on the same clock signal and/or in a power domain operating based on the same driving voltage. The driving voltage and/or the clock signal provided to each of the processor cores may be cut off or connected in units of single cores.

A kernel of the operating system (OS) may monitor the number of tasks in a task queue and the driving voltage and the driving clock of the processor 1110 at specific time intervals to control the processor 1110. In addition, a kernel of the operating system (OS) may control hotplug-in or hotplug-out of the processor 1110 with reference to the monitored information.

The DRAM controller 1120 provides interfacing between the working memory 1130 and the SOC 1100. The DRAM controller 1120 may access the working memory 1130 according to a request of the processor 1110 or another intellectual property (IP) block.

The operating system (OS) or application programs may be loaded into the working memory 1130 during a booting operation. For example, an OS image stored in the storage device 1170 is loaded into the working memory 1130 based on a booting sequence during booting of the electronic device 1000. Overall input/output operations of the electronic device 1000 may be supported by the operating system (OS). The working memory 1130 may be a volatile memory such as a static random access memory (SRAM)

and a dynamic random access memory (DRAM) or a nonvolatile memory device such as a phase-change random-access memory (PRAM), a magnetoresistive random-access memory (MRAM), a resistive random-access memory (ReRAM), a ferroelectric random-access memory (FRAM), and a NOR flash memory.

The performance controller 1140 may adjust operation parameters of the SOC 1100 according to a control request provided from the kernel of the operating system (OS). For example, the performance controller 1140 may adjust the level of dynamic voltage and frequency scaling (DVFS) to enhance performance of the SOC 1100. Alternatively, the performance controller 1140 may generate the frequency selection signals as described above to control the frequencies of the processor cores according to a request of the kernel. In this case, the performance controller 1140 may include a performance table 1142 to set a driving voltage and a frequency of a driving clock therein. The performance controller 1140 may control the PoMU 1144 and the CMU 1146, which together form a power managing circuit, connected to the PMIC 1200 to provide the determined driving voltage and the determined driving clock to each power domain.

The user interface controller 1150 controls user input and output from user interface devices, For example, the user interface controller 1150 may display a keyboard screen for inputting data to the display device 1152 according to the control of the processor 1110. Alternatively, the user interface controller 1150 may control the display device 1152 to display data that a user requests. The user interface controller 1150 may decode data provided from user input means, such as the touch panel 1154, into user input data.

The storage interface 1160 accesses the storage device 1170 according to a request of the processor 1110. For example, the storage interface 1160 provides interfacing between the SOC 1100 and the storage device 1170, For example, data processed by the processor 1110 is stored in the storage device 1170 through the storage interface 1160. Alternatively, data stored in the storage device 1170 may be provided to the processor 1110 through the storage interface 1160.

The storage device 1170 is provided as a storage medium of the electronic device 1000. The storage device 1170 may store application programs, an OS image, and various types of data. The storage device 170 may be provided as a memory card (e.g., multimedia card (MMC), embedded MMC (eMMC), secure digital (SD), MicroSD, etc.). The storage device 170 may include a NAND-type flash memory with high-capacity storage capability. Alternatively, the storage device 1170 may include a next-generation nonvolatile memory such as PRAM, MRAM, ReRAM, and FRAM or a NOR-type flash memory.

The accelerator 1180 may be provided as a separate intellectual property (IP) component to increase processing speed of a multimedia or multimedia data. For example, the accelerator 1180 may be provided as an intellectual property (IP) component to enhance processing performance of a text, audio, still images, animation, video, two-dimensional data or three-dimensional data.

The system interconnector 1190 may be a system bus to provide an on-chip network in the SOC 1100. The system interconnector 1190 may include, for example, a data bus, an address bus, and a control bus. The data bus is a data transfer path. A memory access path to the working memory 1130 or the storage device 1170 may also be provided. The address bus provides an address exchange path between intellectual properties (IPs). The control bus provides a path along which a control signal is transmitted between intellectual properties (IPs). However, the configuration of the system interconnector 1190 is not limited to the above description and the system interconnector 190 may further include arbitration means for efficient anagement, As illustrated in FIG. 3, the performance monitoring system including the plurality of performance monitoring circuits PMU, the monitoring bus MBUS and the embedded trace router 1115 may be integrated in the SOC 1100 to monitor the performance of the SOC 1100. The plurality of performance monitoring circuits PMU may be distributed in the SOC 1100 to collect various performance data.

The processor 1110, the DRAM controller 1120, the performance controller 1140, the user interface controller 1150, the storage interface 1160 and the accelerator 1180 may be connected to the system interconnector 1190. In contrast, the plurality of performance monitoring circuits PMU may be connected to the monitoring bus MBUS.

In contrast, the plurality of performance monitoring circuits PMU may be connected to the monitoring bus MBUS. The monitoring bus MBUS may operate independently of the system interconnector 1190 and may be physically distinct from the system interconnector 1190.

The embedded trace router 1115 may be connected to the system connector 1190 in addition to the monitoring bus MBUS. The embedded trace router 1115 may store the collected performance data in the working memory 1130 through the DRAM controller 1120 or in the storage device 1170 through the storage interface 1160.

Figure 4:
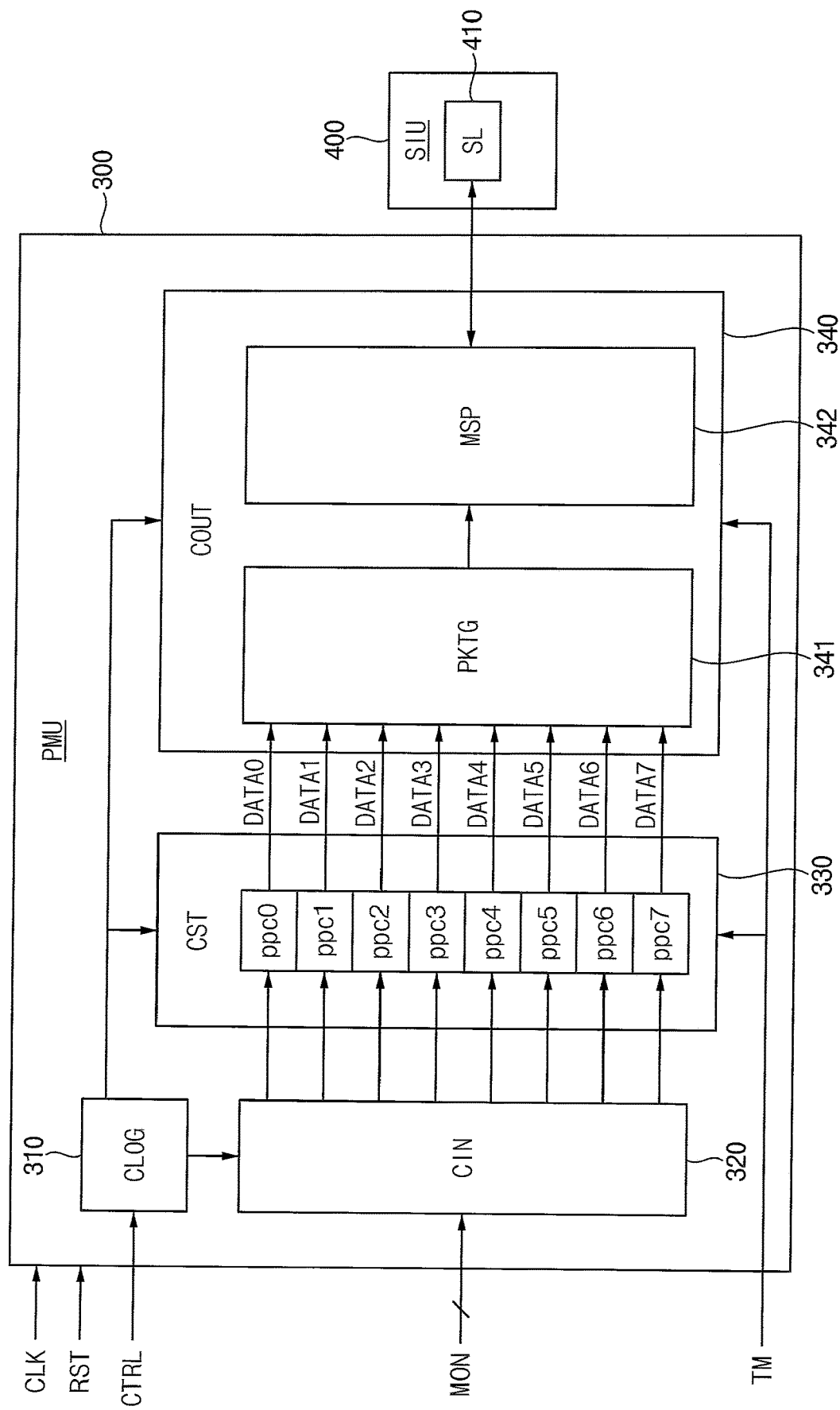
FIG. 4 is a block diagram illustrating a performance monitoring circuit included in a performance monitoring system according to example embodiments of the present disclosure.

FIG. 4 is a block diagram illustrating a performance monitoring circuit included in a performance monitoring system according to example embodiments of the present disclosure.

Referring to FIG. 4, a performance monitoring circuit PMU 300 may include a control logic CLOG 310, an input circuit CIN 320, a storage circuit CST 330 and an output circuit COUT 340. The performance monitoring circuit 300 may operate based on a clock signal CLK and may be initialized based on a reset signal RST.

The control logic 310 may control overall operations of the input circuit 320, the storage circuit 330 and the output circuit 340 based on control signals CTRL provided from an external component (e.g., the processor 1110 in FIG. 3), The control logic 310 may be implemented with a special function register, a microprocessor, and so on.

The input circuit 320 may receive a plurality of monitoring signals MON indicating various performance factors and provide information or signals for performance data to the storage circuit 330. The plurality of monitoting signals MON may include signals indicating external events such as cache miss and interrupt occurrence and the performance factors such as data bandwidth, processing speed of a processor, latency, and so on.

The storage circuit 330 may generate performance data DATA0, DATA1, DATA2, DATA3, DATA4, DATA5, DATA6 and DATA7 (hereinafter referred to as DATA0~DATA7) based on the information of the signals corresponding to one or more performance factors provided from the input circuit 320.

In some example embodiments of the present disclosure, the storage circuit 330 may include a plurality of platform performance counters ppc0, ppc1, ppc2, ppc3, ppc4, ppc5, ppc6 and ppc7 (hereinafter referred to as ppc0~ppc7). For example, each of the plurality of platform performance counters ppc0~ppc7 may receive a corresponding event signal which is selected by the input circuit 320 under control of the control logic 310, and increase a stored count value by one whenever the corresponding event signal is activated. The final count values may be provided as the performance data DATA0~DATA7.

The input circuit 320 and the storage circuit 330 may have different configurations per performance monitoring circuit and are not limited to the configuration of FIG. 4.

The output circuit 340 may include a packet generator PKTG 341 and a monitor master interface circuit MSP 342.

The packet generator 341 may packetize the performance data collected during a unit time to output a plurality of packets corresponding to a plurality of unit times one by one per unit time.

The monitor master interface circuit 342 may divide each packet into a plurality of slices to sequentially transfer the plurality of slices to a serial interconnect circuit SIU 400 included in the monitoring bus MBUS. The monitor master interface circuit 342 may transfer the slices to a slave interface circuit SL 410 included in the serial interconnect circuit 400 according to a handshake scheme as will be described below In some example embodiments of the present disclosure, the storage circuit 330 and the output circuit 340 may operate in synchronization with a timing control signal TM provided from an external component. As will be described below with reference to FIG. 5A, the timing control signal TM may be a signal activated periodically by the unit time. In some example embodiments of the present disclosure, the control logic 310 may store a value to set the unit time, and control the storage circuit 330 and the output circuit 340 to generate one packet per unit time.

Figure 5A:
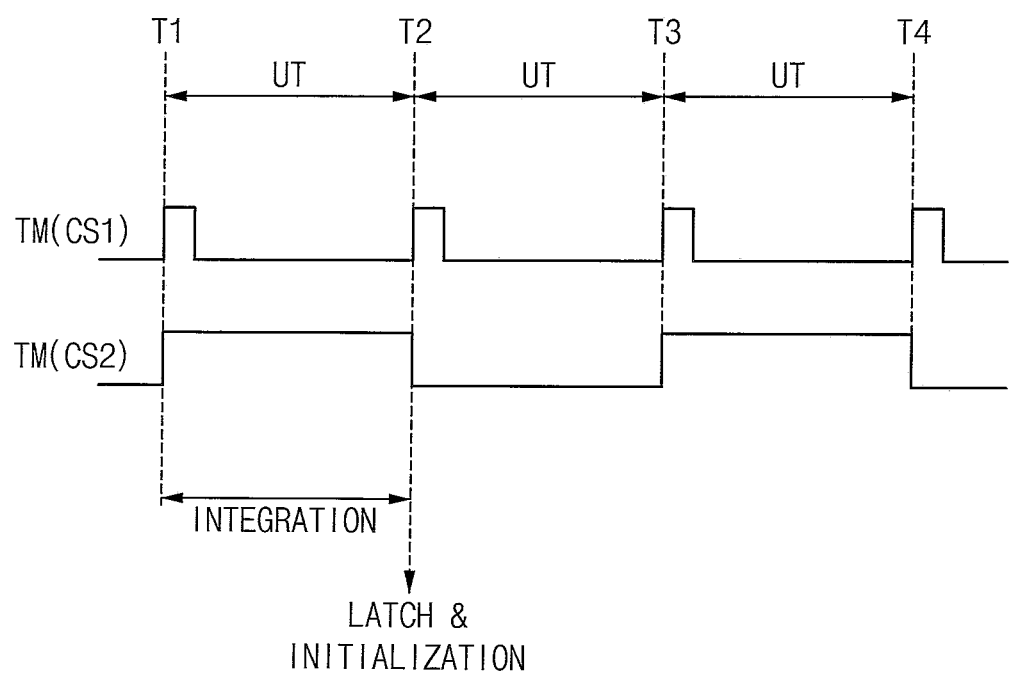
FIGS. 5A and 5B are diagrams illustrating a period of generating performance data of a performance monitoring system according to example embodiments of the present disclosure.
Figure 5B:
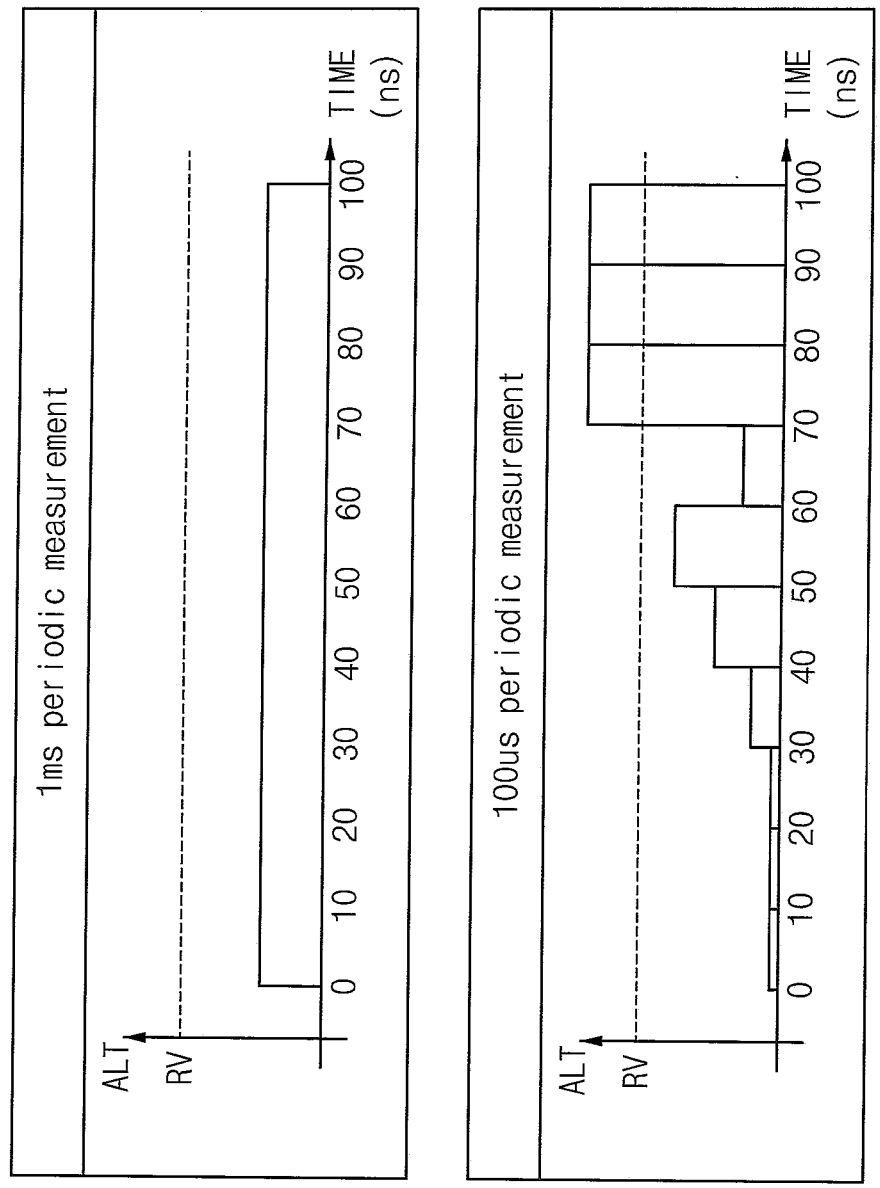

FIGS. 5A and 5B are diagrams illustrating a period of generating performance data of a performance monitoring system according to example embodiments of the present disclosure.

Referring to FIG. 5A, a timing control signal TM may indicate a unit time UT. For example, the timing control signal TM may be activated as a pulse shape per unit time UT as a first case CS1, or transit alternately between a logic high level and a logic low level per unit time UT as a second case CS2. The storage circuit 330 in FIG. 4 may integrate the information from the input circuit 320 during the unit time UT, and the output circuit 300 may latch the output signals from the storage circuit 330, in other words, the performance data DATA1~DATA7 in response to pulse activation (as the first case CS1) or logic level transition (as the second case CS2) of the timing control signal TM. After the performance data DATA0~DATA7 are latched by the output circuit 340, the storage circuit 330 may be initialized to measure the performa.nce factors during the next unit time.

As such, the performance data integrated during a first unit time UT corresponding to the time interval T1~T2 may be packetized as a first packet at the time point T2, the performance data integrated during a second unit time UT corresponding to the time interval T2~T3 may be packetized as a second packet at the time point T3, the performance data integrated during a third unit time UT corresponding to the time interval T3~T4 may be packetized as a third packet at the time point T4, and so on.

As examples, an average latency ALT of an electronic device measured with the unit time UT of one millisecond is illustrated at the upper portion of FIG. 5B, and the average latency ALT measured with the unit time UT of 100 microseconds is illustrated in the lower portion of FIG. 5B.

A problematic situation may be considered to have occurred if the average latency exceeds a reference value RV. As illustrated in FIG. 5B, the problematic situation may not be recognized when the unit time UT is set to one millisecond, but may be recognized when the unit time UT is set to 100 microseconds.

If it is assumed that there is no bottleneck in the monitoring bus MBUS, packet generation of a plurality of performance monitoring circuits may be represented the following expression.

$$F_{Freq} \times S_{Size} \times N_{PMU} \leq S_{ETR}$$

In the above expression, $F_{Freq}$ indicates a packet generation frequency of each performance monitoring circuit, $S_{size}$ indicates a packet size, $N_{PMU}$ indicates the number of the performance monitoring circuits PNIU that transfer the performance data to one embedded trace router ETR, and $S_{ETR}$ indicates a maximum processing speed of the embedded trace router ETR.

As can be gathered from the above expression, the more fine-grained analysis may be possible as the packet generation frequency $F_{Freq}$ is increased. For example, when $S_{ETR}$=1GB/sec, $S_{size}$=80Byte and $N_{PMU}$=200, $F_{Freq}$ may be limited to 62,500 Hz corresponding to the latency of 16 microseconds. In other words, the performance data of the 200 performance monitoring circuits PMU may be collected or dumped maximally to the embedded trace router ETR with the unit time UT of 16 microseconds. As such, when the packet generation frequency $F_{Freq}$ is increased or the unit time UT is decreased, the greater amount of the performance data may be collected and the more fine-grained analysis may be performed.

Figure 6A:
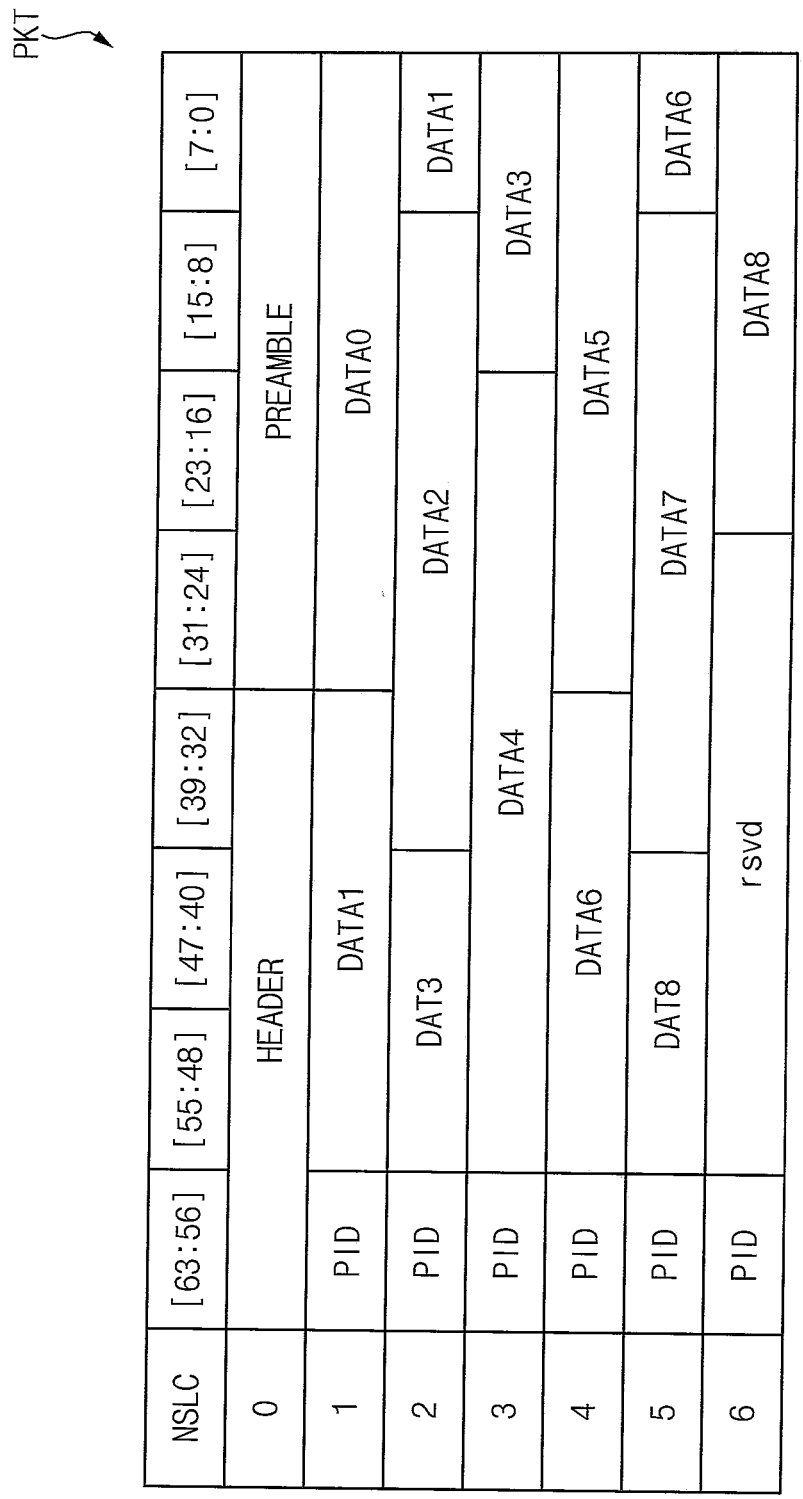
FIGS. 6A and 6B are diagrams illustrating a packet of a performance monitoring system according to example embodiments of the present disclosure.
Figure 6B:
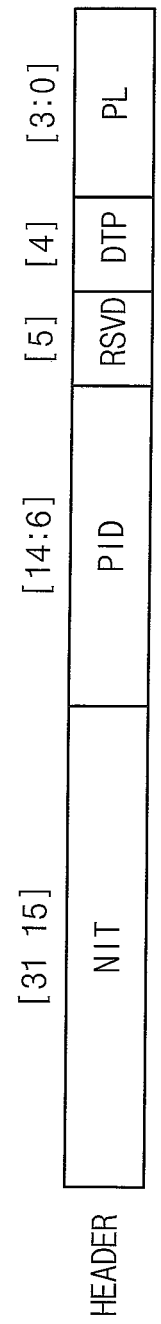

FIGS. 6A and 6B are diagrams illustrating a packet of a performance monitoring system according to example embodiments of the present disclosure. FIGS. 6A and 6B illustrate an example that a bit size of a slice is 64, and a bit size of a header is 32, but the present disclosure is not limited thereto.

Referring to FIG. 6A, a plurality of slices corresponding to each packet PKT may include an information slice and one or more data slices. The slice number NSLC of 0 indicates the information slice and the slice number NSLC of 1 through 6 indicates the data slices. The number of data slices included in each packet may be determined variously.

The information slice may include a preamble indicating the start of each packet and a header including information about each packet. The data slices may include the performance data DATA0~DATA8. In FIG. 6A, "rsvd" indicates reserved bits. In some example embodiments of the present disclosure, each data slice may further include a monitor identifier PID indicating a corresponding performance monitoring circuit that generates each packet. The preamble may be a data pattern that is commonly fixed to with respect to the plurality of performance monitoring circuits.

Referring to FIG. 6B, the header may include a packet length PL indicating a number of a plurality of slices corresponding to each packet, a data type DTP indicating a configuration of the performance data included in each packet, a monitor identifier PID indicating a. corresponding performance monitoring circuit that generates each paCket, and a packet identification number (or an iteration number) NIT indicating an order of each packet among packets generated by the corresponding performance monitoring circuit.

The slices from the plurality of performance monitoring circuits PMU are interleaved through the serial interconnect circuits SIU, and the embedded trace router ETR stores the slices in the memory device 200 in FIG. 1 according to the order of receiving the slices. Therefore, a post processing is required to group the slices corresponding to the same packet. The user may restore each packet by grouping the slices based on the monitor identifier PID and the packet length PL.

Figure 7A:
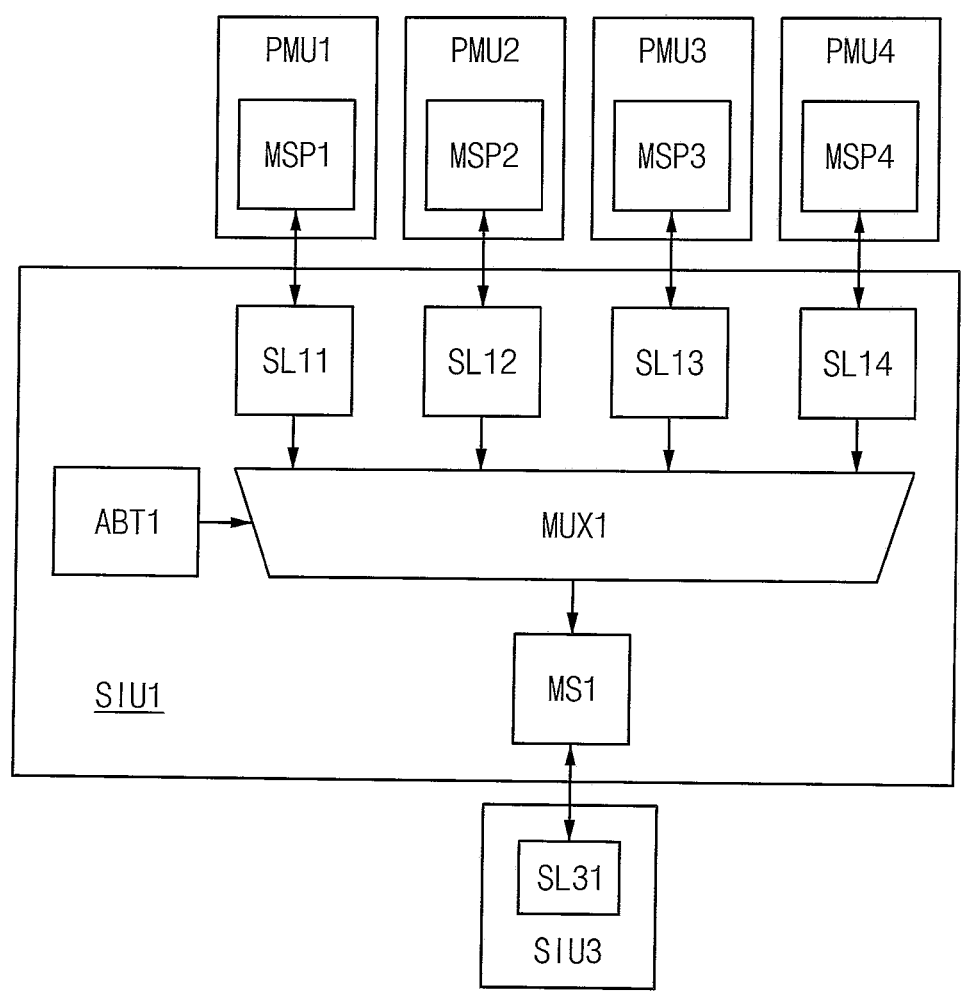
FIGS. 7A and 7B are diagrams illustrating a serial interconnect circuit included in a performance monitoring system according to example embodiments of the present disclosure.
Figure 7B:
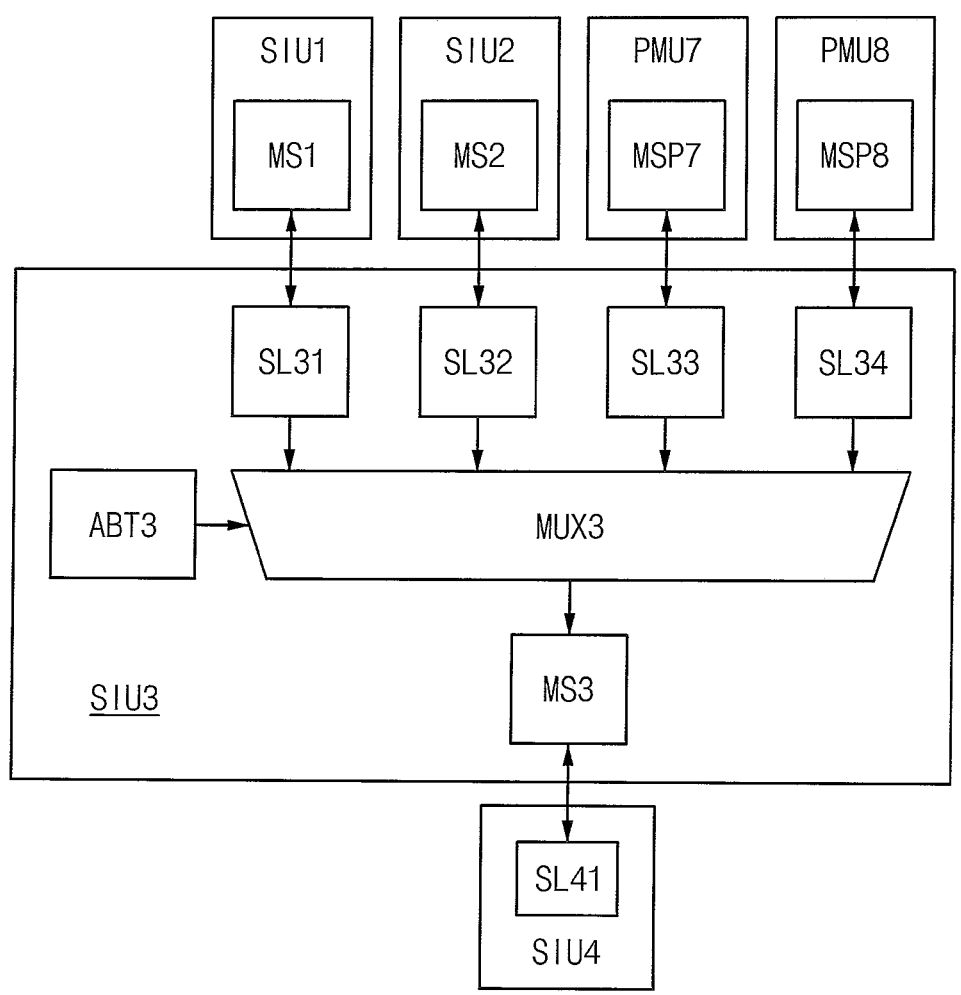

FIGS. 7A and 7B are diagrams illustrating a serial interconnect circuit included in a performance monitoring system according to example embodiments of the present disclosure.

FIG. 7A illustrates an example of the first serial interconnect circuit SIU1 in FIG. 1, and FIG. 7B illustrates an example of the third serial interconnect circuit SIU3 in FIG. 1.

Referring to FIGS. 7A and 7B, each serial interconnect circuit may include two or more slave interface circuits, a multiplexer, an arbitrator and a master interface circuit.

The two or more slave interface circuits may receive the performance data from two or more among the plurality of performance monitoring circuits and the serial interconnect circuits included in a previous stage. The multiplexer may sequentially select and output the performance data received from the two or more slave interface circuits. The arbitrator rrray control an operation of the multiplexer. The master interface circuit may transfer the performance data received from the multiplexer to the serial interconnect circuit included in a next stage or the embedded trace router.

For example, the first serial interconnect circuit SIU1 of FIG. 7A may include four slave interface circuits SL11, SL12, SL13 and SL14, a multiplexer MUX1, an arbitrator ABT1 and a master interface circuit MS1.

The four slave interface circuits SL11, SL12, SL13 and SL14 may receive the performance data respectively from the first through fourth performance monitoring circuits PMU1, PMU2, PMU3 and PMU4 and transfer the performance data to the multiplexer MUX1. As described above, the four slave interface circuits SL11, SL12, SL13 and SL14 may receive the packets including the performance data by units of a slice. The four slave interface circuits SL11, SL12, SL13 and SL14 may receive the slices according to the handshake scheme with four monitor master interface circuits MSP1, MSP2, MSP3 and MSP4 respectively included in the first through fourth performance monitoring circuits PMU12 PMU2, PMU3 and PMU4.

The multiplexer MUX1 may, under control of the arbitrator ABT1, sequentially select and output the performance data received from the four slave interface circuits SL11, SL12, SL13 and SL14.

The arbitrator ABT1 may control the operation of the multiplexer MUX1 such that the MUX1 may select and output the performance data received from the four slave interface circuits SL11, SL12, SL13 and SL14 according to a round robin scheme or a least recently used (LRU) scheme.

The master interface circuit MS1 of the first serial interconnect circuit SIU1 in the first stage STG1 in FIG. 1 may transfer the performance data received from the multiplexer MUX1 to the serial interconnect circuit, e.g., the third serial interconnect circuit SIU3, included in the next stage, in other words, the second stage STG2 in FIG. 1. The master interface circuit MS1 of the first serial interconnect circuit SIU1 may transfer the performance data or the slices according to the handshake scheme with a slave interface circuit SL31 of the third serial interconnect circuit SIU3.

For example, the third serial interconnect circuit SIU3 of FIG. 7B may include four slave interface circuits SL31, SL32, SL33 and SL34, a multiplexer MUX3, an arbitrator ABT3 and a master interface circuit MS3.

Two of the four slave interface circuits SL31 and SL32 may receive the performance data from the first and second serial interconnect circuits SIU1 and SIU2 and the other two of the four slave interface circuits SL33 and SL34 may receive the performance data from the seventh and eighth performance monitoring circuits PMU7 and PMU8 and transfer the performance data to the multiplexer MUX3. As described above, the four slave interface circuits SL31, SL32, SL33 and SL34 may receive the packets including the performance data by units of a slice. The slave interface circuits SL31 and SL32 may receive the slices according to the handshake scheme with the two master interface circuits MS1 and MS2 included in the first and second serial interconnect circuits SIU1 and SIU2 and the slave interface circuits SL33 and SL34 may receive the slices according to the handshake scheme with the two monitor master interface circuits MSP7 and MSPS respectively included in the seventh and eighth performance monitoring circuits PMU7 and PMU8.

The multiplexer MUS3 may, under control of the arbitrator ABT3, sequentially select and output the performance data received from the four slave interface circuits SL31, SL32, SL33 and SL34.

The arbitrator ABT3 may control the operation of the multiplexer MUX3 such that the MUX3 may select and output the performance data received from the four slave interface circuits SL31, SL32, SL33 and SL34 according to a round robin scheme or a least recently used (LRU) scheme.

The master interface circuit MS3 of the third serial interconnect circuit SIU3 in the second stage STG2 in FIG. 1 may transfer the performance data received from the multiplexer MUX3 to the serial interconnect circuit, e.g., the fourth serial interconnect circuit SIU4, included in the next stage, in other words, the third stage STG3 in FIG. 1. The master interface circuit MS3 of the third serial interconnect circuit SIU3 may transfer the performance data or the slices according to the handshake scheme with a slave interface circuit SL41 of the fourth serial interconnect circuit SIU4.

As such, the performance data provided from the plurality of performance monitoring circuits may be interleaved by units of a slice through the plurality of stages, and the serial interconnect circuit in the last stage (e.g., the fourth serial interconnect circuit SIU4 in the third stage STG3 in FIG. 1) may output the signal bus output signal (e.g., the fourth interconnect signal SDT4) to the embedded trace router ETR.

Figure 8A:
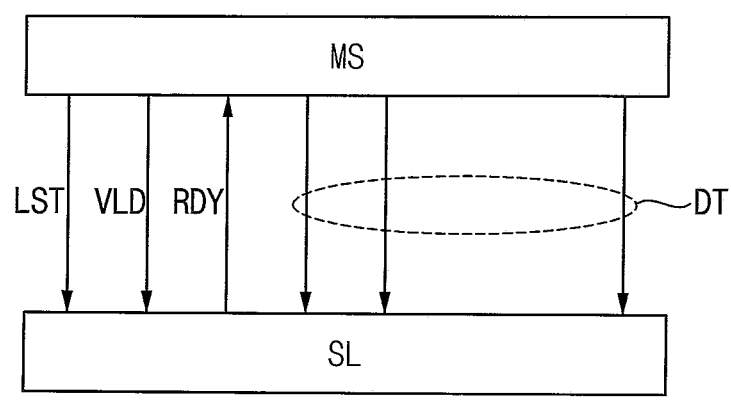
Figure 8C:
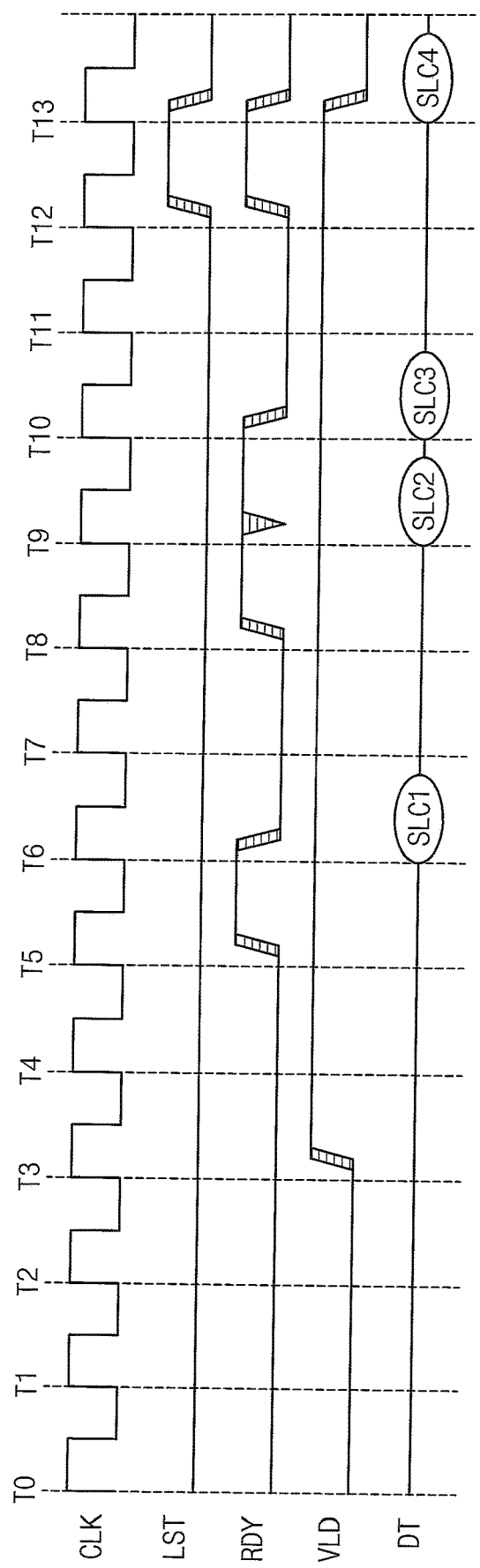

FIGS. 8A, 8B and 8C are diagrams illustrating a transaction performed by a performance monitoring system according to example embodiments of the present disclosure.

FIG. 8A illustrates one master interface circuit MS and one slave interface circuit SL that are respectively included in the two sequential stages. The master interface circuit MS and the slave interface circuit SL may include signal ports to communicate a ready signal RDY, a valid signal VLD, a last signal LST and data signals DT.

FIG. 8B illustrates the ports respectively corresponding to the ready, valid, last and data signals RDY, VLD, DT and LST, the bit size of the ports, the input/output (I/O) type of the ports, and the related description. FIG. 8B illustrates an example that the bit size of the data signal DT is 64 like the slice size of FIG. 6A, but the present disclosure is not limited thereto.

FIG. 8C illustrates an example of transaction according to an advanced extensible interface (AXI) protocol performed by a system according to example embodiments of the present disclosure. The AXI protocol adopts a handshake scheme using the valid signal VID and the ready signal RDY. In FIG. 8C, time points T1~T13 indicate rising edges of a clock signal CLK.

Referring to FIGS. 8A, 8B and 8C, according to the handshake scheme, if the master interface circuit MS is read to transfer a signal to the slave interface circuit SL, the master interface circuit MS may activate the valid signal VLD (e.g., after time point T3), and if the slave interface circuit SL is ready to receive the data signals DT, in other words, to receive each slice of the packet, the slave interface circuit SL may activate the ready signal RDY (e.g., after time point T5). The master interface circuit MS may activate the last signal LST when the master interface circuit MS is ready to transfer the last slice of the packet.

Sampling of signals may be performed in response to the rising edges of the clock signals CLK at both of the master interface circuit MS and the slave interface circuit SL. Accordingly, as illustrated in FIG. 8C, slices SLC1, SLC2, SLC3 and SLC4 may be transferred at the time points T6, 19, T10 and T13 from the master interface circuit MS to the slave interface circuit SL.

As described with reference to FIGS. 8A, 8B and 8C, each of the plurality of performance monitoring circuits and the serial interconnect circuit included in each stage may transfer the performance data or the slices to the embedded trace router or the serial interconnect circuit included in a next stage according to the handshake scheme using the valid signal VLD and the ready signal RDY.

Figure 9A:
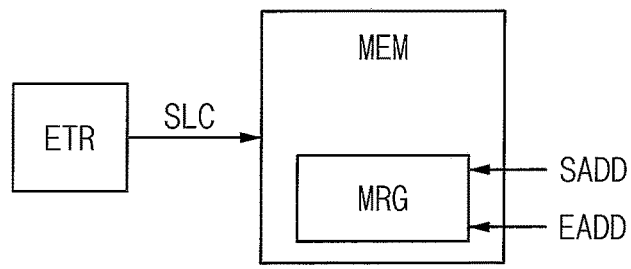
FIGS. 9A, 9B and 9C are diagrams illustrating an example of storing performance data of a performance monitoring system according to example embodiments of the present disclosure.
Figure 9B:
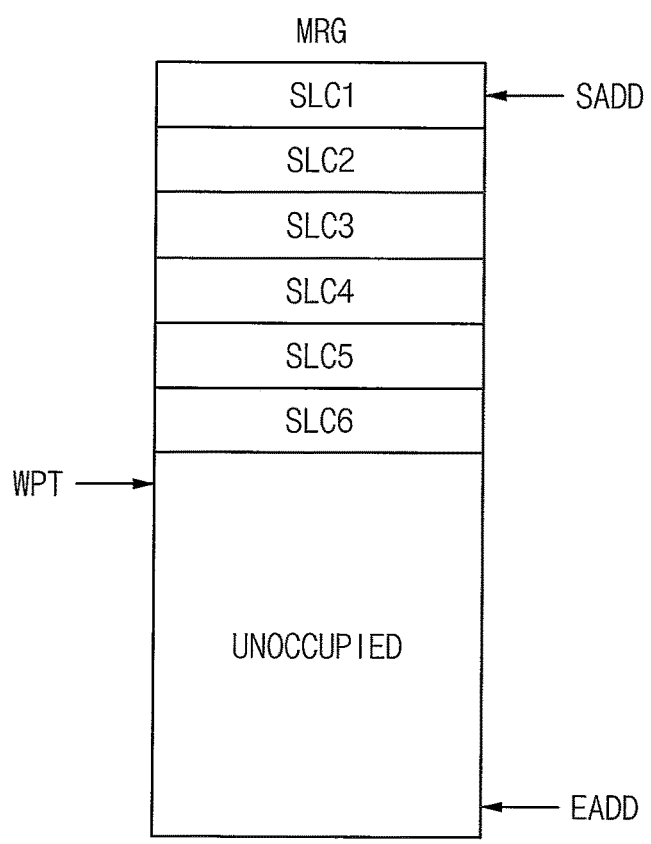
Figure 9C:
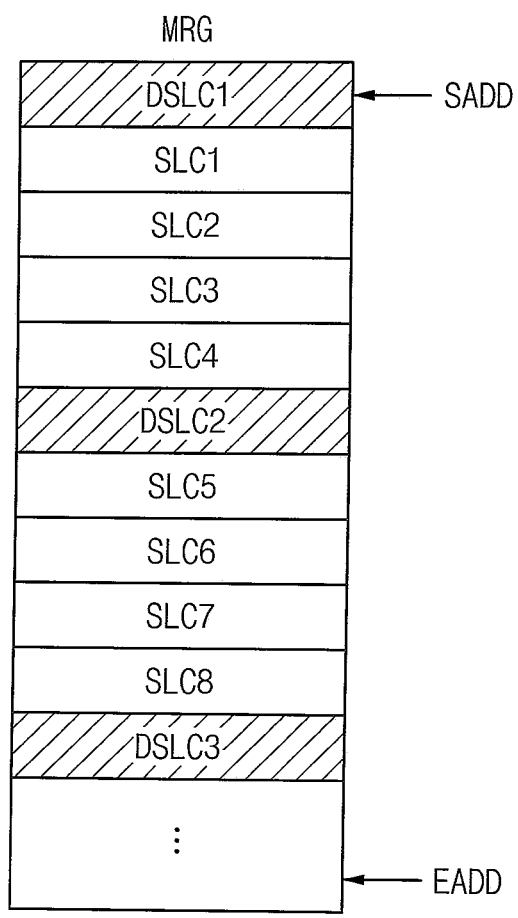

FIGS. 9A, 9B and 9C are diagrams illustrating an example of storing performance data of a performance monitoring system according to example embodiments of the present disclosure.

Referring to FIG. 9A, the embedded trace router ETR may sequentially store the slices SLC in a memory region MRG of the memory device MEM. For example, the memory region MRG to store the slices SLC may be defined by a start address SADD and an end address EADD.

FIG. 9B illustrates an example of slices SLC1, SLC2, SLC3, SLC4, SLC5 and SLC6 (hereinafter referred to as SLC1~SLC6), which are sequentially stored in the memory region MRG, when the index writer IDXW is not included in the performance monitoring system 100 of FIG. 1. The embedded trace router ETR may generate, using a write pointer WPT, a write address at which a present slice is to be stored, and provide the write address with the present slice. The write pointer WPT may indicate a location of an unoccupied region in which the slices are not stored yet.

In some example embodiments of the present disclosure, after the slices are stored in the entire memory region MRG from the start address SADD to the end address EADD, the following slices may be overwritten sequentially from the start address SADD. In this way, more recent slices may be stored in the memory region MRG.

As described above, the embedded trace router ETR may sequentially receive the slices through the bus output signal SDT4 and store the slices in the memory device 200 according to the order of receiving the slices, In other words, in the example of FIG. 9B, the first slice SLC1 may be the slice that the embedded trace router ETR received first, and the sixth slice SLC6 may be the slice that the embedded trace router ETR received last or most recently.

Two adjacent slices, e.g., SLC1 and SLC2, stored in the memory region MRG may be slices that are generated by different performance monitoring circuits, because the slices are interleaved by the monitoring bus MBUS. The user may restore the respective packets based on the information such as the preamble, the header, and the monitor identifier as described above. The preamble may be a data pattern that is commonly fixed with respect to the plurality of performance monitoring circuits, and the header may include the packet length, the data type, the monitor identifier and the packet identification number as described with reference to FIGS. 6A and 6B. The embedded trace router ETR may recognize the start of each packet based on the preamble, and determine the size of each packet based on the information included in the header.

FIG. 9C illustrates an example of slices which are sequentially stored in the memory region MRG, when the index writer IDXW is included in the performance monitoring system 100 of FIG. 1.

As described above, the index writer IDXW may generate a plurality of index slices DSLC1, DSLC2 and DSLC3 (hereinafter referred to as DSLC1-DSLC3) including a packet identification number that sequentially increases per unit time. The index writer IDXW may transfer, through the fourth serial interconnect circuit SIU4 in the last stage STG3, the plurality of index slices DSLC1~DSLC3 to the embedded trace router ETR one by one per unit time. Accordingly, as illustrated in FIG. 9C, the index slices DSLC1~DSLC3 may be interleaved between the slices SLC1~SLC8 which are generated by the plurality of performance monitoring circuits. The user may determine the slices corresponding to each unit time based on the index slices DSLC1~DSCL3.

Figure 10:
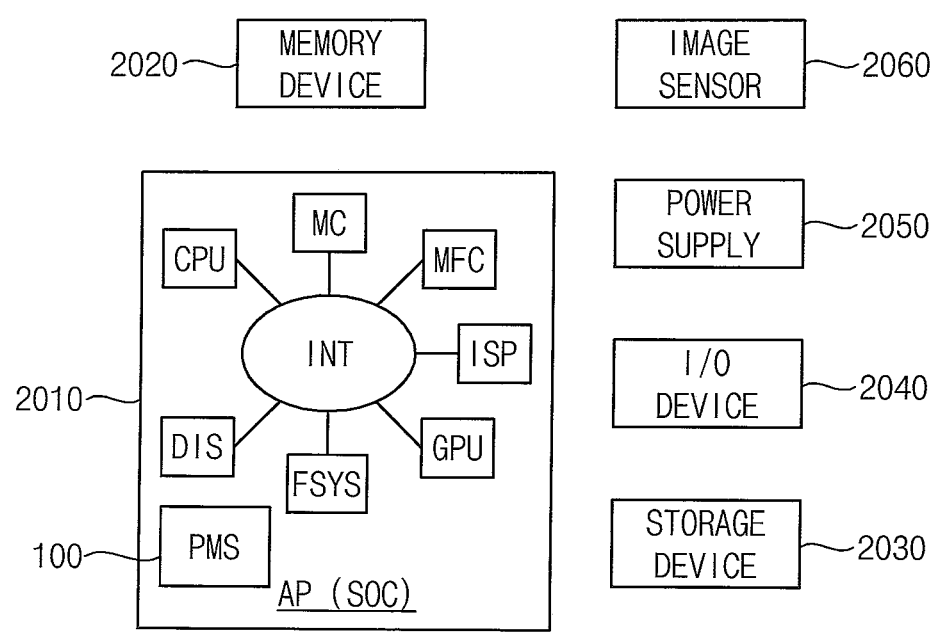
FIG. 10 is a block diagram illustrating a computing system according to example embodiments of the present disclosure.

FIG. 10 is a block diagram illustrating a computing system according to example embodiments of the present disclosure.

Referring to FIG. 10, an electronic device of a computing system 2000 includes a system on chip (SOC) 2010, a memory device 2020, a storage device 2030, an input/output (I/O) device 2040, a power supply 2050 and an image sensor 2060. The computing system 2000 may further include ports that communicate with a video card, a sound card, a memory card, a universal serial bus (USB) device, or other electronic devices.

The SOC 2010 may be an application processor (AP) including an interconnect device INT and a plurality of intellectual properties coupled to the interconnect device INT. For example, the intellectual properties may include a memory controller MC, a central processing unit CPU, a display controller DIS, a file system block FSYS, a graphic processing unit GPU, an image signal processor ISP, a multi-format codec block MFC, etc. For example, the memory controller MC may correspond to a slave device and other intellectual properties may correspond to master devices that use the memory controller MC as a common resource.

The SOC 2010 may include a performance monitoring system PMS 100 as described above. The performance monitoring system 100 may include a plurality of performance monitoring circuits, a monitoring bus and an embedded trace router. The plurality of performance monitoring circuits may be distributed in the SOC 2010 and generate a plurality of monitor output signals including performance data of the SOC 2010. The monitoring bus may receive the plurality of monitor output signals and generate a bus output signal by interleaving the performance data included in the plurality of monitor output signals. The embedded trace router may receive the bus output signal and store, in a memory device (e.g., the memory device 2020 or the storage device 2030), the performance data included in the bus output signal.

The SOC 2010 may communicate with the memory device 2020, the storage device 2030, the input/output device 2040 and the image sensor 2060 via a bus such as an address bus, a control bus, and/or a data bus. In some example embodiments, the SOC 2010 may be coupled to an extended bus, such as a peripheral component interconnection (PCI) bus.

The memory device 2020 may store data for operating the computing system 2000. For example, the memory device 2020 may be implemented with a dynamic random access memory (DRAM) device, a mobile DRAM device, a static random access memory (SRAM) device, a phase-change random access memory (PRAM) device, a ferroelectric random access memory (FRAM) device, a resistive random access memory (RRAM) device, and/or a magnetic random access memory (MRAM) device. The storage device 2030 may include a solid state drive (SSD), a hard disk drive (HDD), a compact dish-read only memory (CD-ROM), etc. The input/output device 2040 may include an input device (e.g., a keyboard, a keypad, a mouse, etc.) and an output device (e.g., a printer, a display device, etc.). The power supply 2050 supplies operation voltages for the computing system 2000.

The image sensor 2060 may communicate with the SOC 2010 via the buses or other communication links. The image sensor 2060 may be integrated with the SOC 2010 in one chip, or the image sensor 2060 and the SOC 2010 may be implemented as separate chips.

The components in the computing system 2000 may be packaged in various forms, such as package on package (PoP), ball grid arrays (BGAs), chip scale packages (CSPs), plastic leaded chip carrier (PLCC), plastic dual in-line package (PDIP), die in waffle pack, die in water form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), system in package (SIP), multi-chip package (MCP), wafer-level fabricated package (WFP), or wafer-level processed stack package (WSP).

The computing system 2000 may be any computing system including at least one SOC. For example, the computing system 2000 may include a digital camera, a mobile phone, a smart phone, a portable multimedia player (PMP), a personal digital assistant (PDA), a tablet computer, etc.

As described above, the system and the method of monitoring performance of an electronic device according to example embodiments of the present disclosure may increase the amount of the collected performance data by collecting the performance data in the single embedded trace router through the independent generation of the performance data by the plurality of performance monitoring circuits and the sequential interleaving of the performance data by the monitoring bus. The fine-grained performance analysis may be implemented based on the increased amount of the performance data.

In addition, the system and the method of monitoring performance of an electronic device according to example embodiments of the present disclosure may increase the transfer speed of the performance data and further increase the amount of the collected performance data by packed zing the performance data and dividing each packet into the plurality of slices to perform interleaving by units of slices.

The present disclosure may be applied to any electronic devices and systems. For example, the present disclosure may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, etc.

The foregoing is illustrative of example embodiments of the present disclosure and is not to be construed as limiting thereof. Although a few example embodiments have been described, those skilled in the art will readily appreciate that many modifications are possible in the example embodiments without departing from the present disclosure.

What is claimed is:

1. A system of monitoring performance of an electronic device, comprising:
a plurality of performance monitoring circuits included in an electronic device; wherein the plurality of performance monitoring circuits are configured to generate a plurality of monitor output signals including performance data of the electronic device;
a monitoring bus configured to receive the plurality of monitor output signals and generate a bus output signal by interleaving the performance data included in the plurality of monitor output signals; and
an embedded trace router configured to receive the bus output signal and store, in a memory de-vice included in the electronic device, the performance data included in the bus output signal,
wherein each performance monitoring circuit of the plurality of performance monitoring circuits is configured to packetize the performance data collected thereby during a unit time to output a plurality of packets corresponding to a plurality of unit times one by one, and configured to divide each packet into a plurality of slices to sequentially transfer the plurality of slices to the monitoring bus.

2. The system of claim 1, wherein the monitoring bus is configured to generate the bus output signal by interleaving, slice by slice, the packets respectively output from the plurality of performance monitoring circuits.

3. The system of claim 2, wherein the embedded trace router is configured to sequentially receive slices through the bus output signal and store the slices in the memory device according to an order of receiving the slices.

4. The system of claim 1, further comprising:
an index writer configured to generate a plurality of index slices including a packet identification number that sequentially increases per unit time and transfer the plurality of index slices to the embedded trace router one by one.

5. The system of claim 4, wherein the monitoring bus is configured to generate the bus output signal by interleaving the slices generated by the plurality of performance monitoring circuits and the plurality of index slices generated by the index writer.

6. The system of claim 1, wherein the plurality of performance monitoring circuits are configured to transfer the performance data included in the plurality of monitor output signals to the monitoring bus according to a handshake scheme, and
wherein the monitoring bus is configured to transfer the performance data included in the bus output signal to the embedded trace router according to the handshake scheme.

7. The system of claim 1, wherein each performance monitoring circuit of the plurality of performance monitoring circuits includes:
a packet generator configured to packetize the performance data collected thereby during a unit time to output a plurality of packets corresponding to a plurality of unit times one by one; and a monitor master interface circuit configured to divide each packet into a plurality of slices to sequentially transfer the plurality of slices to the monitoring bus.

8. The system of claim 7, wherein the plurality of slices corresponding to each packet includes:

an information slice including a preamble indicating a start of each packet and a header including information about each packet; and one or more data slices including the performance data.

9. The system of claim 8, wherein the header includes:

a packet length indicating a number of the plurality of slices corresponding to each packet;

a data type indicating a configuration of the performance data included in each packet;

a monitor identifier indicating a corresponding performance monitoring circuit that generates each packet; and a packet identification number indicating an order of each packet among packets generated by the corresponding performance monitoring circuit.

10. The system of claim 8, wherein each data slice further includes a monitor identifier indicating a corresponding performance monitoring circuit that generates each packet.

11. The system of claim 8, wherein the preamble is a data pattern that is commonly fixed with respect to the plurality of performance monitoring circuits.

12. The system of claim 1, wherein the electronic device comprises a system on chip (SOC) and the system is integrated in the SOC to monitor the performance of the SOC.

13. The system of claim 12, wherein the SOC comprises a system interconnector and a plurality of function blocks connected to the system interconnector, and wherein the monitoring bus is configured to generate the bus output signal by interleaving, slice by slice, the packets respectively output from the plurality of performance monitoring circuits.

14. The system of claim 13, wherein the monitoring bus operates independently of the system interconnector and is physically distinct from the system interconnector.

15. A system of monitoring performance of an electronic device, comprising:

a plurality of performance monitoring circuits included in an electronic device; wherein the plurality of performance monitoring circuits are configured to generate a plurality of monitor output signals including performance data of the electronic device;

a monitoring bus configured to receive the plurality of monitor output signals and generate a bus output signal by interleaving the performance data included in the plurality of monitor output signals; and an embedded trace router configured to receive the bus output signal and store, in a memory de-vice included in the electronic device, the performance data included in the bus output signal, wherein the monitoring bus includes a plurality of stages configured to sequentially interleave and transfer the performance data to the embedded trace router, and each stage of the plurality of stages includes one or more serial interconnect circuits.

16. The system of claim 15, wherein each serial interconnect circuit includes:

two or more slave interface circuits configured to receive the performance data from two or more among the plurality of performance monitoring circuits and the serial interconnect circuits included in a previous stage;

a multiplexer configured to sequentially select and output the performance data received from the two or more slave interface circuits;

an arbitrator configured to control an operation of the multiplexer; and a master interface circuit configured to transfer the performance data received from the multiplexer to a serial interconnect circuit included in a next stage or the embedded trace router.

17. The system of claim 16, wherein the arbitrator is configured to control the multiplexer such that the multiplexer selects and outputs the performance data received from the two or more slave interface circuits according to a round robin scheme or a least recently used (CRU) scheme.

18. The system of claim 15, wherein each of the plurality of performance monitoring circuits and the serial interconnect circuit included in each stage is configured to transfer the performance data to the embedded trace router or the serial interconnect circuit included in a next stage according to a handshake scheme.

19. A method of monitoring performance of an electronic device, comprising:

generating, using a plurality of performance monitoring circuits distributed in an electronic device, a plurality of monitor output signals including performance data of the electronic device;

generating, using a monitoring bus configured to receive the plurality of monitor output signals, a bus output signal by interleaving the performance data included in the plurality of monitor output signals; and storing, using an embedded trace router configured to receive the bus output signal, in a memory device included in the electronic device, the performance data included in the bus output signal, wherein generating the plurality of monitor output signals includes:

packetizing the performance data collected during a unit time by each performance monitoring circuit of the plurality of performance monitoring circuits to output a plurality of packets corresponding to a plurality of unit times one by one; and dividing each packet into a plurality of slices to sequentially transfer the plurality of slices to the monitoring bus.

* * * * *